United States Patent [19]

Green, Sr. et al.

[11] Patent Number: 4,800,287
[45] Date of Patent: Jan. 24, 1989

[54] MEASUREMENT OF IMAGE AREA FROM STORED PIXEL DATA

[75] Inventors: Eugene L. Green, Sr.; Jefferson H. Taylor, both of Dallas, Tex.

[73] Assignee: Wilson Engraving Company, Inc., Dallas, Tex.

[21] Appl. No.: 46,980

[22] Filed: May 5, 1987

Related U.S. Application Data

[63] Continuation-in-part of Ser. No. 840,378, Mar. 17, 1986.

[51] Int. Cl.$^4$ ...................... G01N 21/86; G01B 11/28
[52] U.S. Cl. .................................. 250/560; 356/380; 364/564
[58] Field of Search ............... 356/379, 380; 250/560, 250/578, 559; 382/8, 28; 358/107; 364/564

[56] References Cited

U.S. PATENT DOCUMENTS

| | | | |
|---|---|---|---|
| 4,661,985 | 4/1987 | Akutsu | 356/380 |
| 4,687,107 | 8/1987 | Brown et al. | 356/379 |
| 4,693,378 | 9/1987 | Azegami et al. | 356/379 |

FOREIGN PATENT DOCUMENTS

| | | | |
|---|---|---|---|
| 0051605 | 5/1981 | Japan | 356/379 |
| 0114407 | 7/1984 | Japan | 356/379 |
| 2123143 | 1/1984 | United Kingdom | 356/379 |

Primary Examiner—David C. Nelms
Assistant Examiner—Michael Messinger
Attorney, Agent, or Firm—Dennis T. Griggs

[57] ABSTRACT

Method and apparatus for determining the area of a contrasting image on a transfer sheet are disclosed. The contrasting image is scanned incrementally by a flat bed digital scanner having a single strip of light response cells. As the transfer sheet is advanced incrementally across the rear field of the scanner, the output of the sensor strip is read. Data words (pixels) corresponding to the logic "1" or logic "0" condition of each cell are stored in unique memory locations of random access memory. The number of black information pixels stored in RAM memory are counted. The number of black information pixels divided by the known sensor cell density yields the area of the contrasting image.

2 Claims, 4 Drawing Sheets

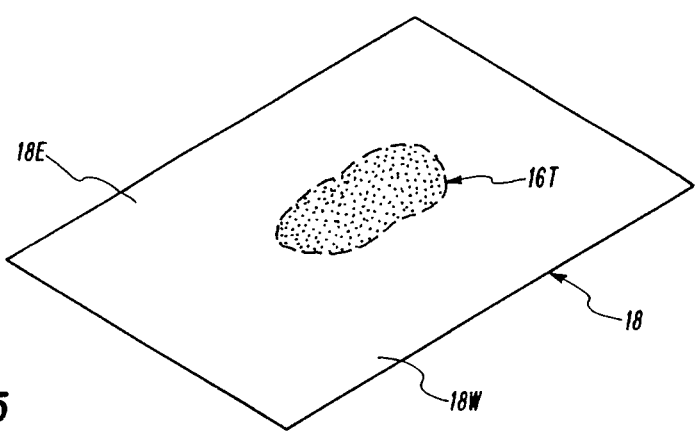
FIG. 5
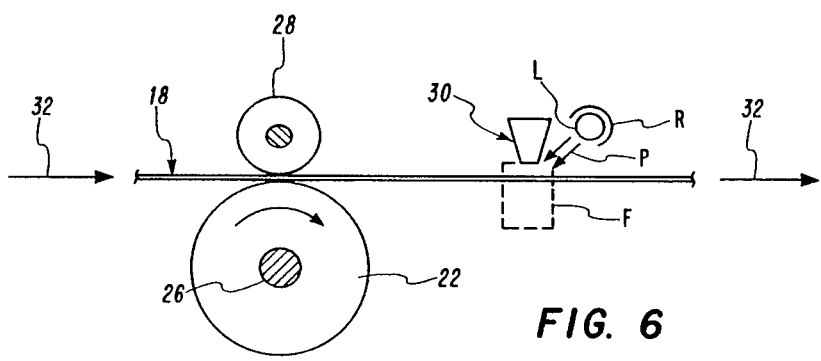
FIG. 6
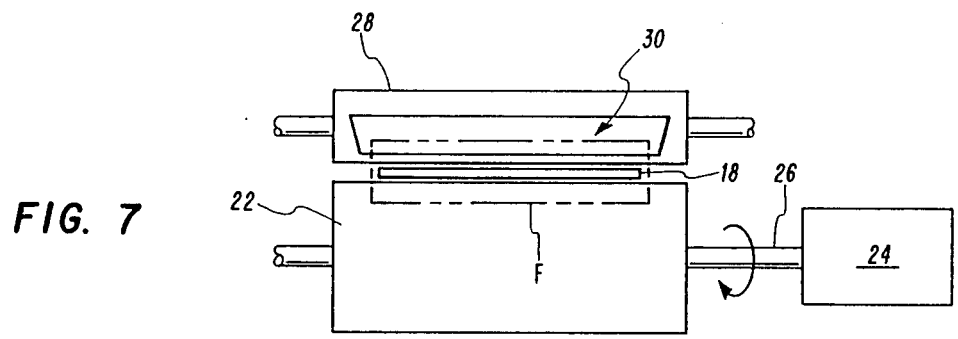
FIG. 7
FIG. 8
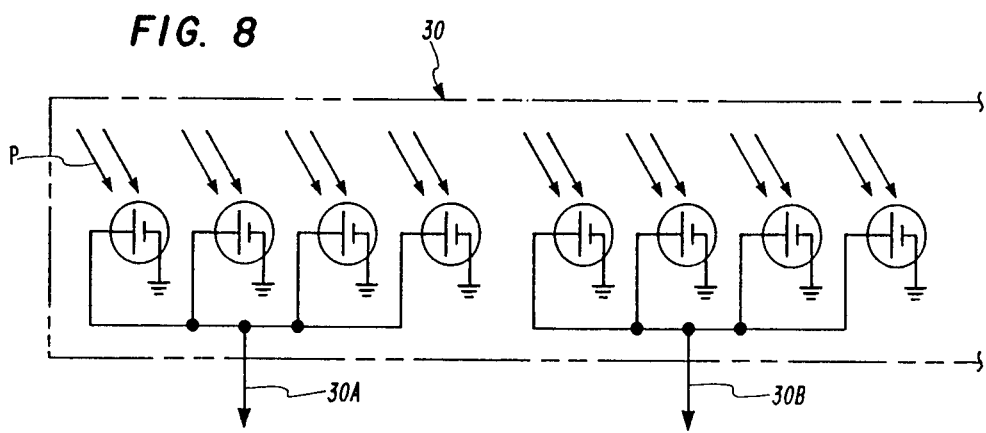

MEASUREMENT OF IMAGE AREA FROM STORED PIXEL DATA

CROSS REFERENCE TO RELATED APPLICATION

This application is a continuation-in-part of Ser. No. 840,378 filed Mar. 17, 1986.

FIELD OF THE INVENTION

This invention relates generally to area measurement, and in particular to method and apparatus for measuring image area from stored pixel data.

BACKGROUND OF THE INVENTION

Fluid metering or transfer rollers, commonly referred to as "anilox rollers", are used in the printing industry to transfer measured amounts of printing ink onto printing plates The surface of anilox rollers is engraved with an array of closely spaced, shallow depressions referred to as "cells". Ink is absorbed into the cells from fountain rollers turning within an ink bath. The transfer surface of the anilox roller is scraped with a doctor blade to remove excess ink. The ink remaining on the anilox roller is that contained within the cells. The plate cylinder transfers ink picked up from the anilox roller to a web of material, either plastic or paper, onto which the desired image is imprinted.

The anilox roller is cylindrical and may be constructed in various diameters and lengths, containing cells of various sizes and shapes. The initial volumetric capacity of an anilox roller is established during manufacturing and is dependent upon the selection of cell size, shape and number of cells per unit area. Depending upon the intended application, the cell pattern may be fine (many small cells per square inch) or coarse (fewer larger cells per square inch). Anilox rollers having high cell density are used for high-quality printing and rollers having the largest cells are used in non-printing applications such as the application of glue or paint.

DESCRIPTION OF THE PRIOR ART

The volumetric capacity of an anilox roller is specified as a combination of metric and English units (billions of cubic microns per square inch). Anilox roller volumetric capacity ranges from one billion cubic microns per square inch to more than 500 billion cubic microns per square inch.

In a printing operation, the anilox roller bears against the printing plate during ink transfer with the result that surface wear occurs and the volumetric capacity of the roller is reduced. Because of this surface wear, it is desirable to accurately determine the volumetric capacity of the roller from time-to-time to maintain print quality. Since the cell structure of most anilox rollers is too small to be resolved by the naked eye, a metallurgical microscope is usually required for cell inspection and evaluation.

Previous attempts to determine the capacity of the anilox roller by making measurements with a metallurgical microscope have not been totally satisfactory. The microscope may be used for direct examination of the transfer cell structure, or indirectly by examination of a molded replica of the cell structure. In either case, calculation of cell volume requires tedious mathematical manipulation of formulae which are often inexact. Different formulae are required for different geometries and some cell structures are so complex that they defy a close approximation of their volume. Ceramic rolls, which have irregular cells, are also difficult to measure and conventional calculations of such irregular cell capacity are virtually meaningless.

The decrease in cell volume caused by wear can sometimes be compensated by changing the ink formulation. After surface wear has occurred to such an extent that compensation cannot be obtained by changing the ink formulation, the worn roller is sometimes used on less critical applications. Eventually, volumetric capacity is reduced to such an extent that the anilox roller must be removed from service and refinished with a new engraved transfer surface. Moreover, when trouble-shooting a printing problem, the trouble may sometimes be caused by one or more sources, e.g., the paper, the ink formulation, roller synchronization, or the wear condition of the anilox roller. At such times, there is a need to quickly verify the volumetric capacity of the anilox roller so that its condition can be ruled out as a possible cause of the printing problem. It is generally desirable to measure the volumetric capacity of the anilox roller periodically and assess its wear rate, thereby establishing an estimated replacement date.

SUMMARY OF THE INVENTION

The measurement method of the present invention utilizes a basic characteristic of the anilox roller, that is, the ability to carry or absorb a specific volume of ink per unit surface area. Utilization of this technique is essentially opposite in nature to the use of the roller in printing. That is, in the method of the present invention, a measured amount of ink is deposited onto the surface of the anilox roller and then the transfer area that the measured amount of ink will cover is determined. The ink is dispensed from a precision micro pipette directly onto the surface of the anilox roller. A sheet of transfer material having low absorbency is then spread over the roller and the ink deposit lying between the anilox roller and the transfer sheet is spread by the application of a scraper blade across the backside of the transfer paper. The engraved cells are filled by the excess ink as it is spread across the cell transfer surface. Upon completion of spreading the ink deposit, the transfer paper is carefully removed and the transfer impression is allowed to dry.

According to the present invention, the area of the transfer impression is measured with the aid of a digital scanner and electronic counting circuit. In this arrangement, the transfer impression is scanned incrementally by a flat bed digital scanner having a single strip of light responsive cells. As the roll transfer sheet is advanced relative to the scanner, the output of the sensor strip is read. Light reflected from a white area on the transfer sheet causes the sensor cells illuminated by the reflected light to change conductive state, thereby producing a logic "1" or logic "0" on the output of each sensor cell. Data words (pixels) corresponding to the logic "1" or logic "0" condition of each cell are stored in unique memory locations of a random access memory (RAM). After the transfer impression has been completely scanned, the number of black information pixels stored in RAM memory are counted. The number of black information pixels divided by the known sensor cell density yields the area of the transfer impression in square inches. The volumetric capacity of the roller is then calculated by dividing the known ink sample volume by the calculated area, yielding capacity in billions of cubic microns per square inch.

The novel features which characterize the invention are defined by the appended claims. The foregoing advantages and features of the invention will hereinafter appear, and for purposes of illustration of the invention, but not of limitation, an exemplary embodiment of the invention is shown in the appended drawings.

BRIEF DESCRIPTION OF THE DRAWINGS

FIG. 5 is a perspective view of a transfer sheet having an ink impression;

FIG. 6 is a side elevational view which illustrate the digital scanning apparatus of the invention;

FIG. 7 is a front elevational view of the scanning apparatus shown in FIG. 6

FIG. 8 is a simplified circuit diagram of a photoresponsive cell array; and,

DETAILED DESCRIPTION OF THE PREFERRED EMBODIMENT

Figure 1:
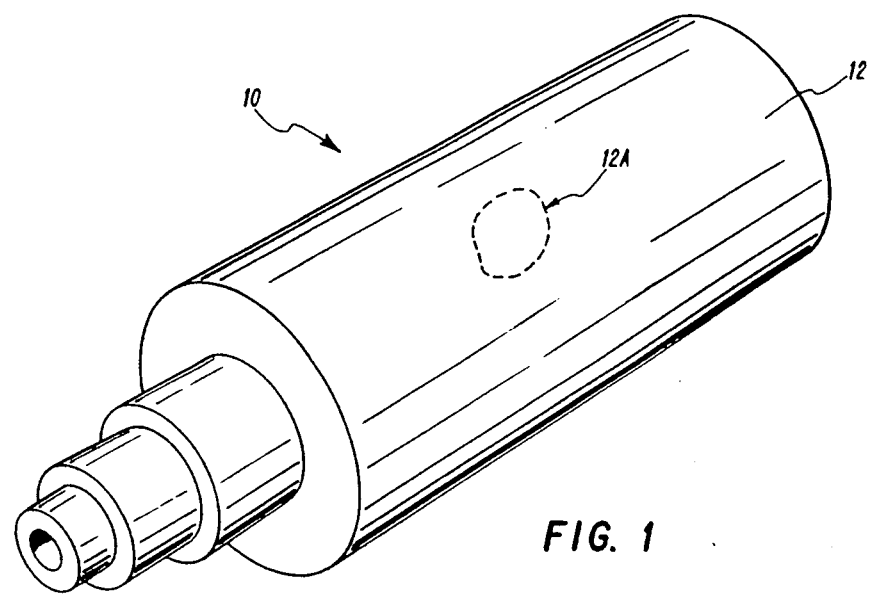
FIG. 1 is a perspective view of an anilox roller having an engraved transfer surface.

In the description which follows, like parts are indicated throughout the specification and drawings with the same reference numerals, respectively.

Referring now to FIGS. 1–5, the method and apparatus of the present invention provides an accurate measurement of the volumetric capacity of a fluid metering or transfer roller 10, commonly referred to as an anilox roller, which is used extensively in the flexographic printing trade to transfer closely controlled quantities of ink from fountain rollers running in an ink bath to a printing plate roller or cylinder. The transfer surface 12 of the anilox roller 10 is engraved to produce tiny depressions or cells 14 which generally cover the surface of the anilox roller, with the aggregate volume of the cells defining a reservoir from which ink is transferred onto the printing plate roller.

Figure 2:
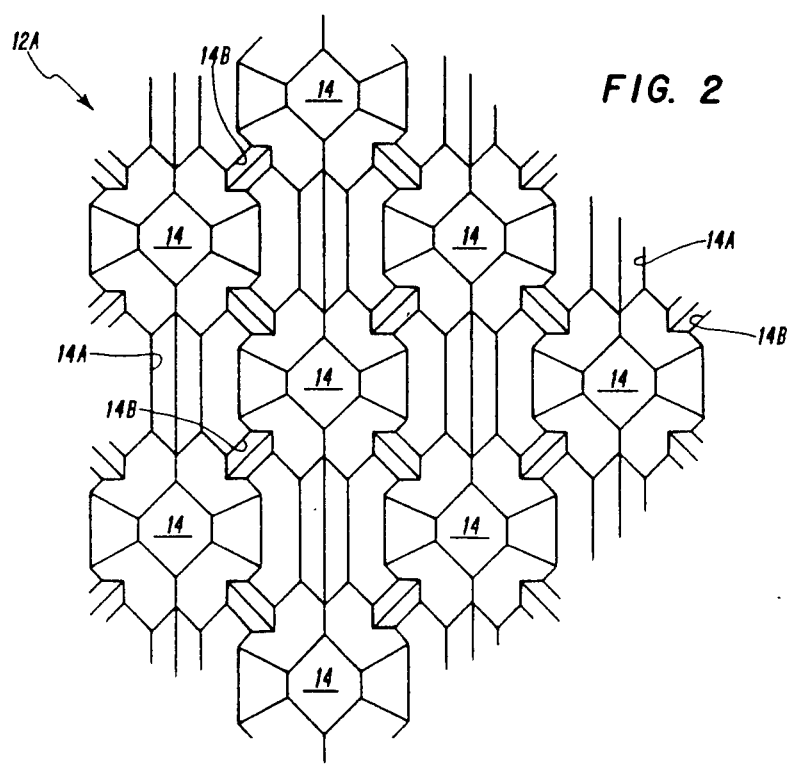
FIG. 2 is an enlarged view of the engraved cells which are formed upon the transfer surface of the anilox roller of FIG. 1.
Figure 3:
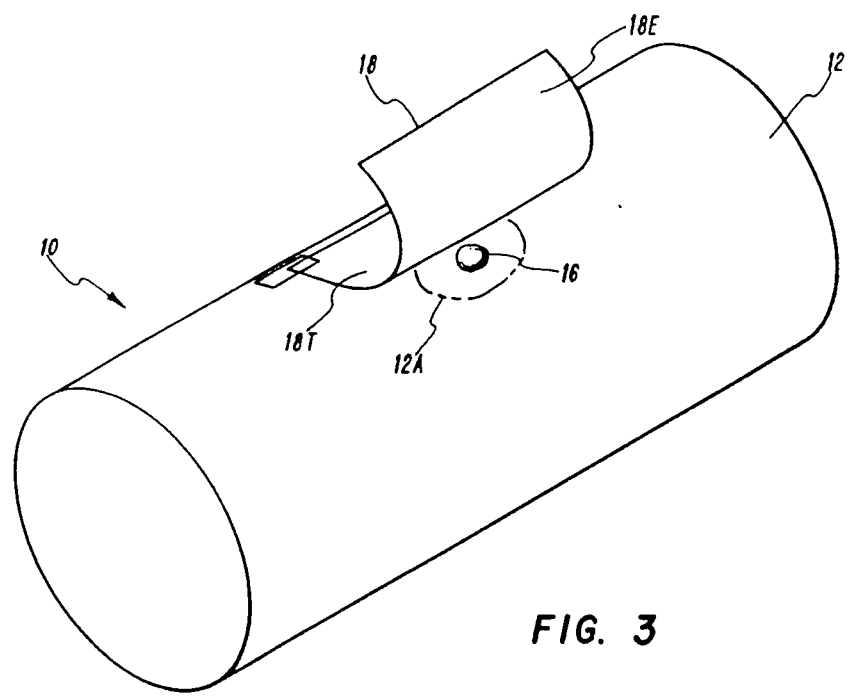
FIG. 3 is a simplified perspective view of an anilox roller which illustrates the deposit step of the present invention.
Figure 4:
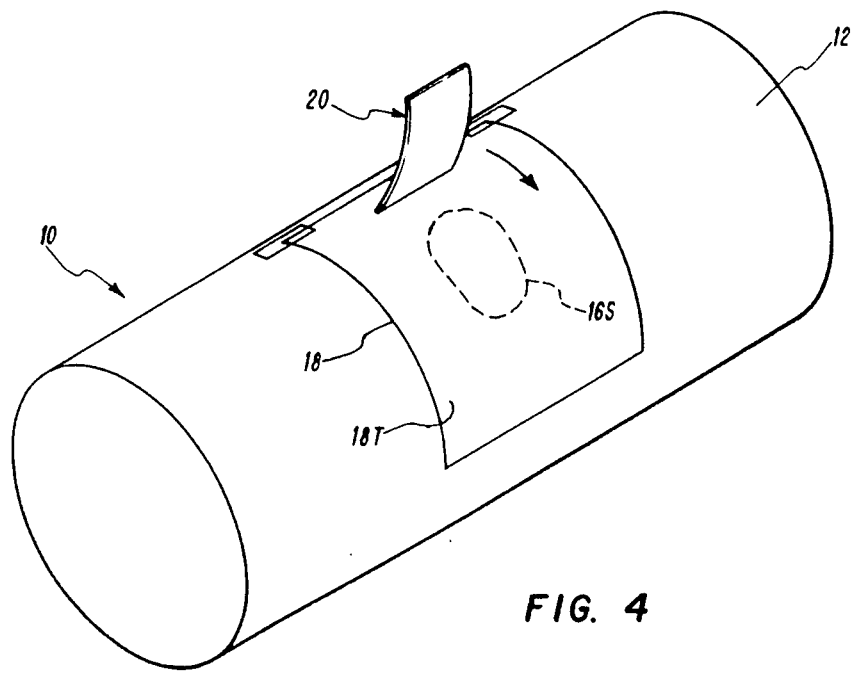
FIG. 4 is a simplified perspective view similar to FIG. 3 which illustrates the spreading transfer step of the invention.

The cell configuration as illustrated in FIG. 2 is hexagonal, with adjacent cells being interconnected by channels 14A, 14B. The channels 14A, 14B provide an escape for air which prevents cavitation and reduces the resistance to filling of the cell and also eliminates the suction effect as the transfer surface is applied to the printing plate, thereby promoting smooth lay-down and uniform ink distribution.

As the anilox roller 10 is used, the transfer surface 12 wears away. Because such wear substantially reduces the cell capacity, it is desirable to accurately determine the volumetric capacity of the roller transfer surface from time-to-time.

According to the method of the present invention, a roller transfer surface 12A is selected for the determination of volumetric capacity. Usually, only one test per roller is required, since the anilox rollers tend to wear uniformly, thus the specific location of the selected transfer surface 12A is arbitrary. The selected transfer site 12A is thoroughly cleaned to remove accumulated ink deposits.

After the selected transfer site has been cleaned, a measured volume 16 of specially prepared ink is deposited onto the cleaned transfer surface 12A. The ink is preferably prepared from a high-quality, oil-base, flat black paint which has been thinned with acetone. Acetone is preferred as the thinning agent because it yields a fine-grained medium which is quick drying. A small amount of boiled linseed oil is added to the mixture to somewhat retard the drying time so that the ink does not dry before it is fully spread over the transfer surface. While various ink formulations may be used to good advantage, it is important that the ink not dry too quickly, to allow substantially complete dispersion of the ink deposit.

The ink deposit 16 is dispensed in a known measured amount by a calibrated micro pipette. The micro pipette is a capillary tube in which a plunger is received. A calibrated volume line and a liquid level immersion line are marked onto the sidewall of the capillary tube. The micro pipette is filled by dipping its lower end into a volume of ink and drawing a measured quantity of ink into its capillary bore by retracting the plunger until the ink level coincides with the calibrated volume marking. Micro pipettes are available in volume capacities of 5, 10, 20, 25, 50 and 100 microliters. The micro pipette delivers its charge to within one percent of its rated volume.

After the micro pipette has been charged with a known volume of ink, it is positioned over the cleaned transfer area 12A. The plunger is extended through the capillary bore, which discharges a small droplet 16 of ink onto the prepared surface.

The ink deposit 16 is then dispersed into the cells of the transfer surface 12A to produce a spread deposit 16S. The dispersing step is performed by drawing the deposit 16 across the transfer surface with the edge of a blade or other squeegee instrument. Alternatively, the dispersing step is performed by spreading the deposit 16 across the transfer surface 12A with a non-absorbant roller, for example a smooth ceramic roller.

The roller surface area covered by the spread deposit 16S is determined by producing an impression 16T of the spread deposit by contacting the spread deposit with a low-absorbency transfer sheet 18. Plastic sheet materials are preferred for the impression sheet 18. A non-absorbant polyester film may be used to good advantage. The amount of ink absorbed by the polyester napp is negligible. The impression sheet 18 is preferably durable and flexible with one side 18E having an etched treatment. The etched side 18E captures enough ink so that a high-contrast image 16T of the spread cell area 16S is produced, but will absorb only a negligible amount of ink as the deposit 16 is spread.

The impression transfer sheet 18 is taped onto the transfer surface 12 and is then carefully positioned over the measured ink deposit 16. After the impression sheet has been correctly positioned, it is pressed against the deposit 16 to cause the deposit 16 to migrate through the interface between the prepared transfer surface 12A and the etched side 18E of the impression sheet.

The pressing step is performed by scraping the external surface 18T of the impression sheet with a squeegee instrument 20. Alternatively, the pressing step is performed by applying a rolling force against the external surface 28T with a cylindrical roller. Upon completion of the dispersed ink deposit 16S, the image transfer sheet 18 is carefully removed to prevent smearing of the impression, and is allowed to dry. The drying time of the preferred ink agent is approximately three minutes.

While plastic sheet material is preferred for producing the dispersed impression 16T, some paper materials which have been specially treated to be non-absorbant may be used to good advantage. In this regard, it is not necessary to pick up all of the ink, only enough to produce a high-contrast impression 16T.

The area of the spread deposit is next determined according to either of two preferred methods: manually, with the aid of a transparent grid overlay, as disclosed in U.S. Pat. No. 4,628,728, and automatically, with the aid of a digital scanner as disclosed herein. The known volume of the ink deposit is divided by the measured area to yield the volumetric capacity of the anilox roller in billions of cubic microns per square inch.

Referring now to FIGS. 5, 6, 7, 8 and 9, accurate measurement of the transfer impression area 16T is provided by a digital scanner and counting circuit 34 which electronically resolves the transfer sheet surface into discrete black and white picture elements (pixels) and then counts the total number of black information pixels produced during a complete scan cycle.

After the image transfer sheet 18 has been prepared with a dispersed impression 16T, the sheet is inserted into the nip of a driven roller 22. The driven roller 22 is rotated incrementally by a stepping motor 24 which is mechanically connected to the driven roller 22 by a shaft 26. The transfer sheet 18 is gripped between the driven roller 22 and an idler roller 28 whereby it is advanced in the direction indicated by arrow 32 in response to rotation of driven roller 22.

The transfer sheet 18 is moved in steps across the read field F of a sensor bar 30. The sensor bar 30 includes a linear array of charge coupled devices (CCD) for detecting black and white areas on the anilox roll transfer sheet 18. The sensor bar 30 preferably contains 2500 CCD detector cells in a linear array (1×2500), and which are ganged in groups of four cells to provide approximately 625 cell groups across the read field F. For a linear array (1×625) of 625 cells spaced across eight inches, gangs of four cells will provide 75 cell group receptors per linear inch.

The sensor read field F is illuminated by a lamp L, with the light rays P emitted by the lamp L being focused by a reflector R upon the transfer sheet surface lying within the field F directly beneath the array of light sensitive cells. The sensitivity of the sensor cells is adjusted to cause each cell to change state in response to reflected light from a white area 18W of the transfer sheet 18, and to be non-responsive to the level of light reflected by the ink impression area 16T.

As the anilox roll transfer sheet 18 is advanced incrementally across the read field F, the outputs 30A, 30B, ... of the sensor bar 30 are read 75 times per linear inch so that a 75×75 matrix of 5625 cells per square inch results.

The sensor 30 extends across the width of the transfer sheet 18 (approximately 8½ inches) and reads a single line of area bits across the page. Each area bit corresponds with the photo-receptive area of a single gang of four sensor cells as shown in FIG. 8. The CCD sensor cells are ganged in groups of four cells per group to effectively provide 625 cell groups across the read line, yielding 75 cells per scan line inch. By utilizing the sensors in this manner, the scan rate is increased substantially without compromising accuracy.

The anilox roll transfer sheet 18 is pulled across the read field F of the scanner by the action of the feed roller 22 which is driven by the stepping motor 24. The action of the stepping motor causes the transfer sheet 18 to be advanced at a rate of 75 steps per inch. The arrangement of 75 detector cell groups per inch horizontally with 75 steps per inch vertically produces a matrix of 5625 cells per square inch (75×75). As the anilox roll transfer sheet 18 is advanced across the read field F, the output of the sensor bar is read each time the sheet is advanced providing a 75×75 matrix of 5625 cells per square inch, with each cell within the matrix having either a logic "1" or a logic "0" state, with the state of each device corresponding with the intensity level of light reflected from the transfer sheet 18.

As the roll transfer sheet 18 is advanced relative to the scanner, the output of each cell group in the sensor bar is read. Light reflected from a white area on the transfer sheet causes the sensor cells illuminated by the reflected light rays P to change conductive state, thereby producing a logic "1" or a logic "0" on the output of a cell group receiving reflected light. The intensity of the light reflected from a black area within the impression 16T is not sufficient to cause the sensor cell to change state, so that its state remains in its initial logic condition.

Data words (pixels) corresponding to the logic "1" or logic "0" condition of each cell group are stored in unique memory locations of a random access memory 36 (RAM). After the transfer impression has been completely scanned, the number of pixels corresponding with black information are counted by a microprocessor 38. The number of black information pixels divided by the known sensor cell density yields the area of the transfer impression in square inches. The volumetric capacity of the roller is then calculated by dividing the known ink sample volume by the calculated area, thereby yielding capacity in billions of cubic microns per square inch.

Figure 9:
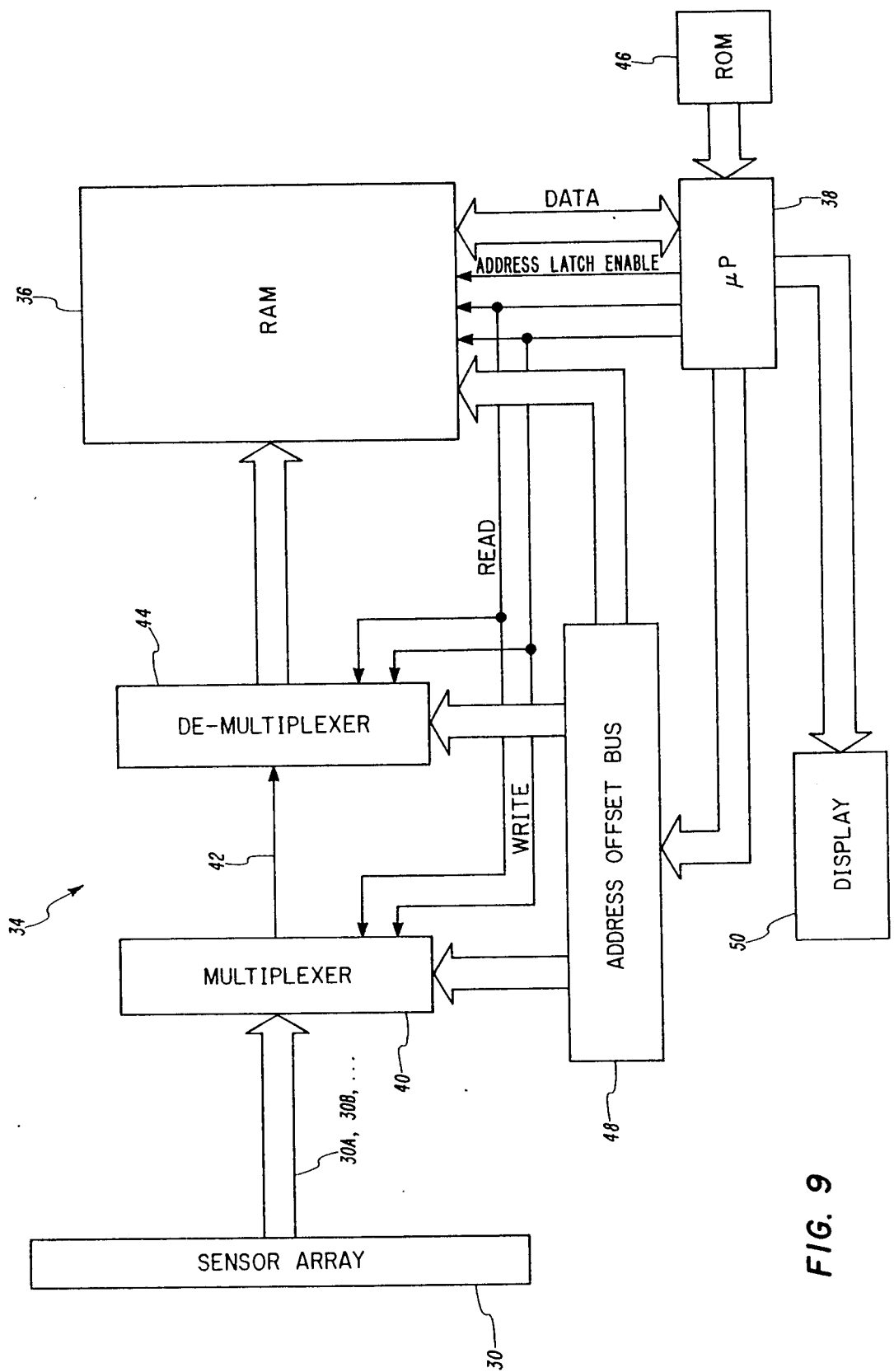
FIG. 9 is a simplified block diagram of a digital scanning circuit.

Referring now to FIG. 9, the output of the scanner bar 30 is input to a multiplexer 40 so that as each cell group is addressed its output is connected to the output 42 of the multiplexer. The multiplexer output line 42 then is input to a demultiplexer 44 so that the data bits are arranged as eight bit data words (pixels). These data words are then stored in a dedicated area of the random access memory 36 (RAM) so that, for each area bit on the anilox roll transfer sheet, a logic "1" pixel or logic "0" pixel corresponding with black or white information is stored in a unique address location in the dedicated RAM memory. The control signals WRITE, READ, ADDRESS LATCH ENABLE necessary for performing these operations are provided by the microprocessor 38 as directed by read only memory 46 (ROM) firmware. The operations are coordinated through an address offset bus 48.

After the data words are stored in the RAM memory, the microprocessor counts the number of black information pixels loaded into RAM memory then divides this by 5625 (the number of cells per square inch) to obtain the number of black sample information square inches contained in the anilox roll transfer impression. The number of square inches thus obtained are divided into the known ink sample size used. The known ink sample size is given in billions of cubic microns so the volumetric capacity is given in billions of cubic microns per square inch. This result then is displayed on a liquid crystal display 50 and also may be printed out by a printer attached to the system.

Although the invention has been described with reference to preferred method and apparatus, and with reference to a specific fluid metering roller, the foregoing description is not intended to be construed in a limiting sense. Various modifications of the disclosed method and apparatus as well as alternative applications of the invention will be suggested to persons skilled in the art by the foregoing specification and illustrations. For example, the method and apparatus of the present invention can be used to good advantage for comparing and evaluating the finishes of highly polished surfaces. It is therefore contemplated that the appended claims will cover any such modifications or embodiments that fall within the true scope of the invention.

What is claimed is:

1. A method for measuring the area of an image formed on a sheet comprising the steps:

directing light onto the sheet;

reflecting light from the sheet onto the sensor read field of a linear array of light responsive sensor cells, each sensor cell having first and second logic states corresponding with first and second levels of incident light;

advancing said sheet incrementally relative to the sensor read field of said array in a sequence of scanning increments in which said image is traversed by said read field;

generating a digital data word corresponding with the logic condition for each sensor cell during each scanning increment;

storing the data words corresponding to the logic condition of each sensor cell in unique address locations of a memory;

counting the number of data words corresponding with the production of a selected one of said logic states in response to the reflection of light from the image area;

dividing the number of counted data words by a number corresponding with the known sensor cell density.

2. Apparatus for measuring the area of an image superimposed on a background sheet of contrasting color comprising, in combination:

an array of light responsive sensor cells, said cells having first and second logic states corresponding with first and second levels of incident light;

means for illuminating the background sheet and reflecting the light from the sheet onto the array of light responsive cells;

means for advancing the background sheet incrementally to the sensor read field of said array in a sequence of scanning increments in which said image is traversed by said read field;

means for generating a digital data word corresponding with the logic condition of each cell during each scanning increment;

a memory for storing digital data words in unique address locations;

means for storing the data words corresponding to the logic condition of each cell in unique address locations of the memory;

means for counting the number of data words corresponding with the production of a selected one of said logic states in response to the reflection of light from the image area; and, means for dividing the number of counted data words by a number corresponding with the known sensor cell density.

* * * * *